United States Patent
Ma et al.

(10) Patent No.: US 10,803,043 B2
(45) Date of Patent: Oct. 13, 2020

(54) MANAGING HASH INDEXING

(71) Applicant: SAP SE, Walldorf (DE)

(72) Inventors: Zhan-feng Ma, Shanghai (CN); Tianlun Chen, Shanghai (CN); Zhi-ping Xiong, Shanghai (CN); Hu Yin, Shanghaic (CN)

(73) Assignee: SAP SE, Walldorf (DE)

( * ) Notice: Subject to any disclaimer, the term of this patent is extended or adjusted under 35 U.S.C. 154(b) by 318 days.

(21) Appl. No.: 15/907,884

(22) Filed: Feb. 28, 2018

(65) Prior Publication Data
US 2019/0266267 A1    Aug. 29, 2019

(51) Int. Cl.
*G06F 16/22* (2019.01)
*G06F 16/23* (2019.01)
*G06F 16/21* (2019.01)

(52) U.S. Cl.
CPC ........ *G06F 16/2272* (2019.01); *G06F 16/217* (2019.01); *G06F 16/2255* (2019.01); *G06F 16/23* (2019.01)

(58) Field of Classification Search
CPC .... G06F 16/2272; G06F 16/217; G06F 16/23; G06F 16/2255
USPC .................................................. 707/769, 696
See application file for complete search history.

(56) References Cited

U.S. PATENT DOCUMENTS

| | | | | |
|---|---|---|---|---|
| 2010/0257181 A1* | 10/2010 | Zhou | .................. | G06F 16/2255 707/747 |
| 2013/0085986 A1* | 4/2013 | Burger | ................... | G06F 9/505 707/609 |
| 2014/0330785 A1* | 11/2014 | Isherwood | ............. | H04L 67/10 707/640 |
| 2015/0220583 A1* | 8/2015 | Teletia | ................ | G06F 16/2272 707/696 |
| 2017/0116246 A1* | 4/2017 | Fang | ................ | G06F 17/30336 |
| 2018/0300330 A1* | 10/2018 | Samwel | ............. | G06F 16/2456 |

* cited by examiner

*Primary Examiner* — Evan Aspinwall
(74) *Attorney, Agent, or Firm* — Schwegman Lundberg & Woessner, P.A.

(57) ABSTRACT

Various examples are directed to systems and methods for managing hash indexing in a database management system. A database management system may receive first index usage data for a first index describing a database. The database management system may determine a first hash index effectiveness for the first index based at least in part on the first index usage data. The database management system may compare the first hash index effectiveness to a threshold hash index effectiveness. The database management system may modify a hash index status of the first index based at least in part on the comparing.

20 Claims, 9 Drawing Sheets

MANAGING HASH INDEXING

TECHNICAL FIELD

This document generally relates to methods and systems for use with computing devices, including networked computing devices. More particularly, this document relates to systems and methods for efficiently utilizing indexes to execute database queries.

BACKGROUND

Database management systems utilize indexes to increase the speed and efficiency of database queries. Rows or records in a database table are typically not sorted or otherwise ordered. When the database management system receives a query requesting records meeting certain criteria, the database management system may need to traverse all records in the database table to identify the record or records that meet the query criteria. To streamline query execution, the database management system builds and/or uses indexes. Indexes are used as finding tools that allow the database management system to locate requested records faster.

BRIEF DESCRIPTION OF DRAWINGS

The present disclosure is illustrated by way of example, and not limitation, in the following figures.

DETAILED DESCRIPTION

Figure 1:
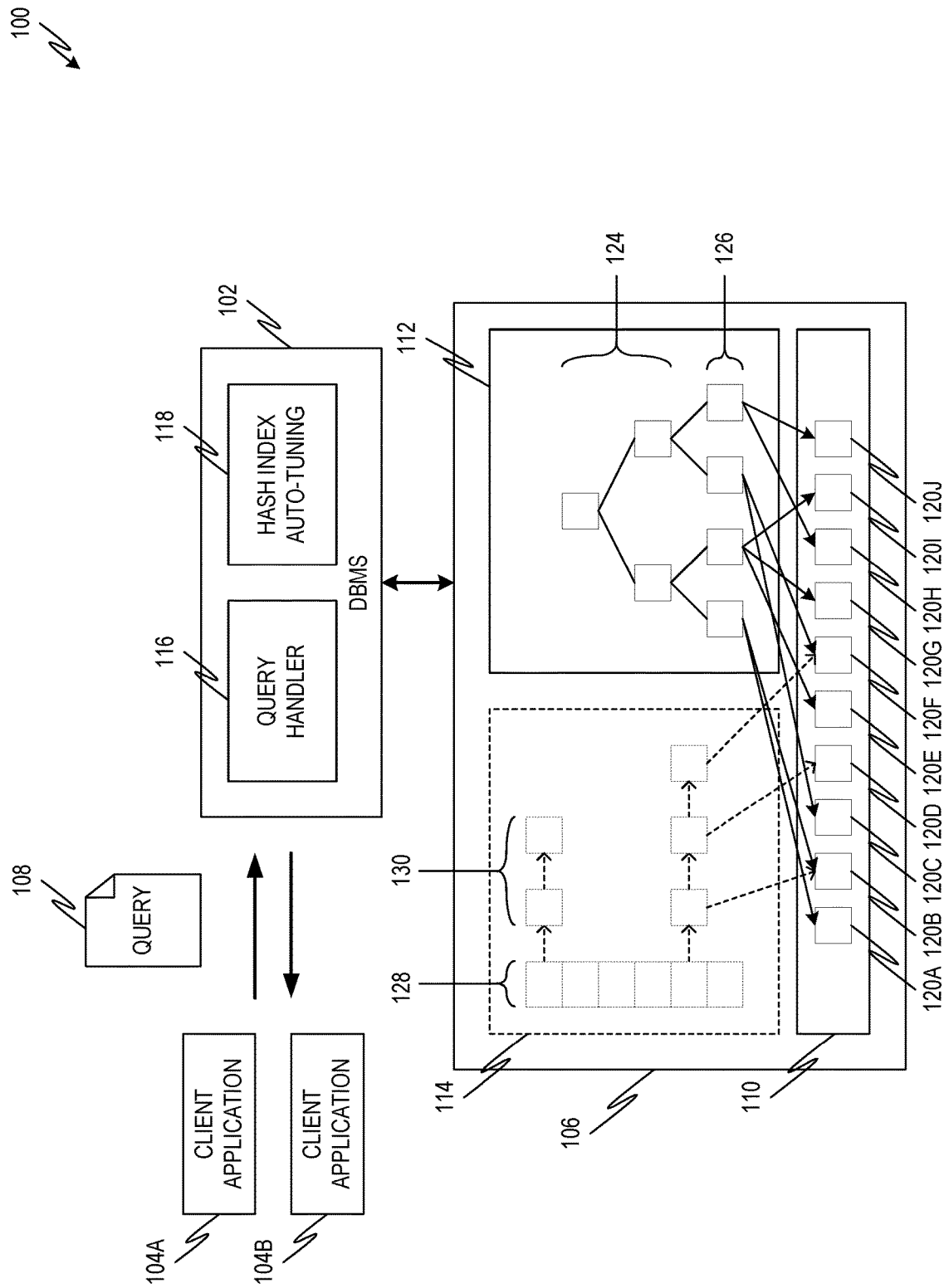
FIG. 1 is a diagram showing one example of an environment demonstrating hash index auto-tuning.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Various examples described herein are directed to managing hash indexing. An index is an ordering of records by values for a field of the records. A field that is used to build an index is referred to herein as an index field. Instead of traversing an entire table or other dataset, a database management system uses the index to "look up" a record or records that correspond to a received query. For example, the query may include one or more values for the index field. The one or more received values for the index field, sometimes referred to as index keys, are used in conjunction with the index to locate records that have the indicated value or values at the index field. Indexes can take different forms including, for example, doubly linked lists, B-trees, etc.

Consider an example database table including records that describe employees. The records may include fields describing employee location, employee department, employee last name, etc. An example index may use employee department as an index field. The database management system may receive a query requesting records for all employees in a particular department, where the particular department is the value for the index field and may be referred to as the index key. The database management system identifies at the index an index node that corresponds to the index key, which in this example is the particular department. The identified index node points to one or more records corresponding to employees in the particular department. The database management system then returns the identified records from the table.

As the number of records represented in an index grows, responding to queries even using the index can become inefficient. For example, with a B-tree index, the database management system traverses each level of the index to find a given index node. As the number of entries and the number of levels grow, the processing performed to use the index also grows.

Index efficiency can sometimes be improved by implementing a hash index. The hash index comprises a hash table including a number of hash nodes. The database management system identifies hash nodes, at least in part, by finding a hash of an index key. For example, consider a hash index describing employee records where the index field describes the employee's last name. The database management system may receive a query requesting records corresponding to a particular last name (e.g., "Smith"). The particular last name is used as the index key. The database management system applies a hash function to the index key to find a hash of the index key. The hash of the index key may describe a hash node at the hash table. If a record having the index key as a value for the index field exist (e.g., records corresponding to employees having the name "Smith"), the hash node includes pointers to the record.

The hash index is useful for responding to point queries. A point query, as described in more detail herein, is a query that requests one or more records that exactly match an index field value or index key. In other words, a point query can be processed using a single index key. For example, consider a table including records that describe sales transactions. A point query may request records corresponding to sales transactions, if any, on a particular date. The particular date, then, can be used as a single index key to identify a hash node at the hash index. On the other hand, an example query that requests records over a range of search criteria is not a point query. In the example above of the table including sales transaction records, a query that requests records for sales transactions that occurred over a range of dates (e.g., between Nov. 1, 2017, and Nov. 5, 2017) is not a point query.

In some examples, a hash index is implemented as a secondary index, built in addition to a unique primary index, such as a B-tree index or other type of index. The hash index may be built to include hash nodes corresponding to index keys that are commonly accessed with point queries. Also, in some examples, the hash index is stored in memory (e.g., system memory or cache memory) that has a faster access time than the data storage where the primary index is stored. When a point query is received, the database management system first attempts to locate a hash node at the hash index corresponding to the point query. If a hash node is found, the query is processed with the hash index. If no hash node is found, the query is processed with the primary index. When the hash index is stored in cache memory and the primary index is a B-tree index, the arrangement is sometimes referred to as hash cache B-tree (HCB) indexing.

Building and maintaining the hash index uses resources including memory storage to store the hash table as well as processing resources to evaluate whether received queries are point queries and to determine if the hash index has a hash node corresponding to the received query. Also, if no hash node is found, the database management system may still need to traverse the primary index to respond to the query. As described herein, the hash index can provide advantages. For example, if a received query is a point query and if the hash index includes a hash node corresponding to the received query, processing the query using the hash cache can be faster and more efficient than using a B-tree or other type of index. However, if queries using the index are not commonly point queries or do not typically include index field values represented in the hash index, hash index may not work for these queries. For example, range queries and quieries in which not all index columns are specified may not be suitable for use with a hash index.

Some examples are directed to systems and methods for automatically tuning one or more indexes to selectively enable or disable hash indexing. A database management system is programmed to collect or access index usage data for one or more indexes. The index usage data for an index describes the way that queries using the index are processed, including, for example, the number of times that the index is used, the number of point queries processed with the index, the number of times a hash table of a hash index is searched, the number of times that a matching hash node is found, etc. From the index usage data, the database management system determines a hash index effectiveness. The hash index effectiveness is an indication of the efficiency advantage that could be gained by using a secondary hash index with the index. If the hash index effectiveness for the index is above a threshold effectiveness, the database management system may continue to use a hash index with the primary index. If the hash index effectiveness for the index is not above the threshold effectiveness, the database management system ends or fails to begin the use of a hash index with the index.

FIG. 1 is a diagram showing one example of an environment 100 demonstrating hash index auto-tuning. The environment 100 comprises a database management system 102 that manages a database 106. The database 106 includes a plurality of records organized according to a schema. For example, the schema describes one or more tables or other sub-units of records. The database 106 may be stored at any suitable data storage device or across multiple storage devices at the same physical location or distributed across multiple physical locations. The database management system 102 may be or include any suitable database management system. In some examples, the database management system 102 may be or include an example of the HANA system from SAP SE of Walldorf, Germany, an example of the VORA system, also from SAP SE of Walldorf, Germany, an example of the SAP ASE system, also from SAP SE of Walldorf, Germany, etc.

The database management system 102 may be programmed to manage data stored at the database 106. For example, the database management system 102 may be programmed to load data to the database 106 and/or to execute one or more queries 108 of the database 106. The database management system 102 may comprise any suitable computing device or computing devices such as, for example, one or more servers.

Database queries, such as the example query 108, may be received from one or more client applications 104A, 104B. Client applications 104A, 104B may execute, for example, at any suitable computing device local to or remote from the one or more computing devices implementing the database management system 102. In some examples, queries comprise one or more expressions that describe one or more records at the database 106.

The database management system 102 comprises a query handler 116 for receiving and responding to queries, such as the query 108. In some examples, the query handler 116 utilizes one or more indexes at the database 106 to identify records referenced by a query, such as the query 108. For example, FIG. 1 also shows an example table 110 at the database 106. The table 110 comprises records 120A, 120B, 120C, 120D, 120E, 120F, 120G, 120H, 120I, 120J (120A-J). Each record 120A-J comprises a number of fields. For example, the records 120A-J may correspond to rows of the table 110, and fields of the records 120A-J may correspond to columns of the table 110. For clarity, only ten records are shown in the example table 110. It will be appreciated, however, that the systems and methods disclosed herein may be utilized with tables including many more than ten records. Also for clarity, only one table 110 is shown in FIG. 1. It will be appreciated, however, that systems and methods disclosed herein may be utilized with databases 106 organized according to schemas that include more than one table.

The records 120A-J are described by a primary index 112. The primary index 112 organizes the records 120A-J based on index keys, where the index keys are values for an index field of the records 120A-J. The primary index 112 comprises nodes, at least some of which refer to records 120A-J. For example, an index node corresponding to a particular index key points to records 120A-J, if any, that have the index key as a value at the index field. In an example where the records 120A-J describe employees, the index field may describe employee location, employee last name, employee first name, etc. Also, although one primary index 112 is shown for the table 110, in some examples, the table 110 may have multiple primary indexes, e.g., organized according to different index fields. For example, the employee records described above may have one primary index for which an employee location field is the index field and another primary index for which an employee department field is the index field. The systems and methods described herein for tuning a hash index may be applied to more than one index describing the same table 110, for example, at the same time. Also, the systems and methods described herein for tuning a hash index may be applied to more than one index describing multiple tables, for example, at the same time.

Any suitable type of index may be used as the primary index 112. In the example of FIG. 1, the primary index 112 is a B-Tree unique index comprising internal nodes 124 and leaf nodes 126. Leaf nodes 126 correspond to one or more index keys and may point to one or more records 120A-J having corresponding index keys as values for the index field. To utilize the primary index 112, the database management system 102 (e.g., the query handler 116 thereof) uses the internal nodes 124 to identify a leaf node or leaf nodes 126 describing a particular index key or range of index keys. The identified leaf node or leaf nodes 126 point to one or more of the records 120A-J, which may be returned.

In the example of FIG. 1, some or all of the records 120A-J may also be described by a hash index 114. The hash index 114 is shown with dashed lines to indicate that it may be present or not present depending on the records 120A-J and operating conditions as described herein. The hash index 114 comprises a hash table 128 that includes hash nodes. A hash function is used to map an index key to a hash node. A hash node may, but need not, include a pointer 130 that points to records 120A-J having index field values that match the index key. (In some examples, if there are no records 120A-J having a particular index key as an index field value, the index key will map to a hash node, but the hash node will have no pointers 130.) The hash index 114, when present, may reside in a main memory of the database management system, a cache of the database management system 102 or other memory location (e.g., a memory location with a short access time).

As described in more detail below, in some examples where the hash index 114 is present, it may be built on-the-fly. For example, when a point query is received that references a particular index field value which does not have a corresponding hash node, the database management system 102 may add a new hash node at the hash table 128, this hash node includes a hash value which is calculated on the index field value. The next time a query references the same index field value, the database management system 102 responds to the query utilizing the hash index 114.

In some examples, to improve efficiency, the database management system 102 updates the hash index 114 using a non-locked method, such as compare and swap (CAS). For example, the database management system 102 (e.g., the query handler 116 thereof) may execute multiple threads that respond to queries concurrently. When one thread determines to write to the hash index 114, it may compare the hash node to-be-modified to a previous version of the hash node. If the values match, the database management system 102 completes the write. If the values do not match, the database management system 102 does not complete the write. If the values do not match, it may indicate that another thread of the database management system 102 has modified the hash node since the current thread last read it and the write may fail. The comparison and writing (or not writing) may be atomic, meaning that it either completes or fails as a whole operation. Utilizing CAS to update the hash index 114 may be more efficient than utilizing a locked method and may increase efficiency.

The database management system 102 also includes a hash index auto-tuning system 118. The hash index auto-tuning system 118 is configured to monitor the usage of the primary index 112. Based on the usage of the primary index 112, the database management system 102 determines whether to utilize the hash index 114 or not utilize the hash index 114, as described herein.

Figure 2:
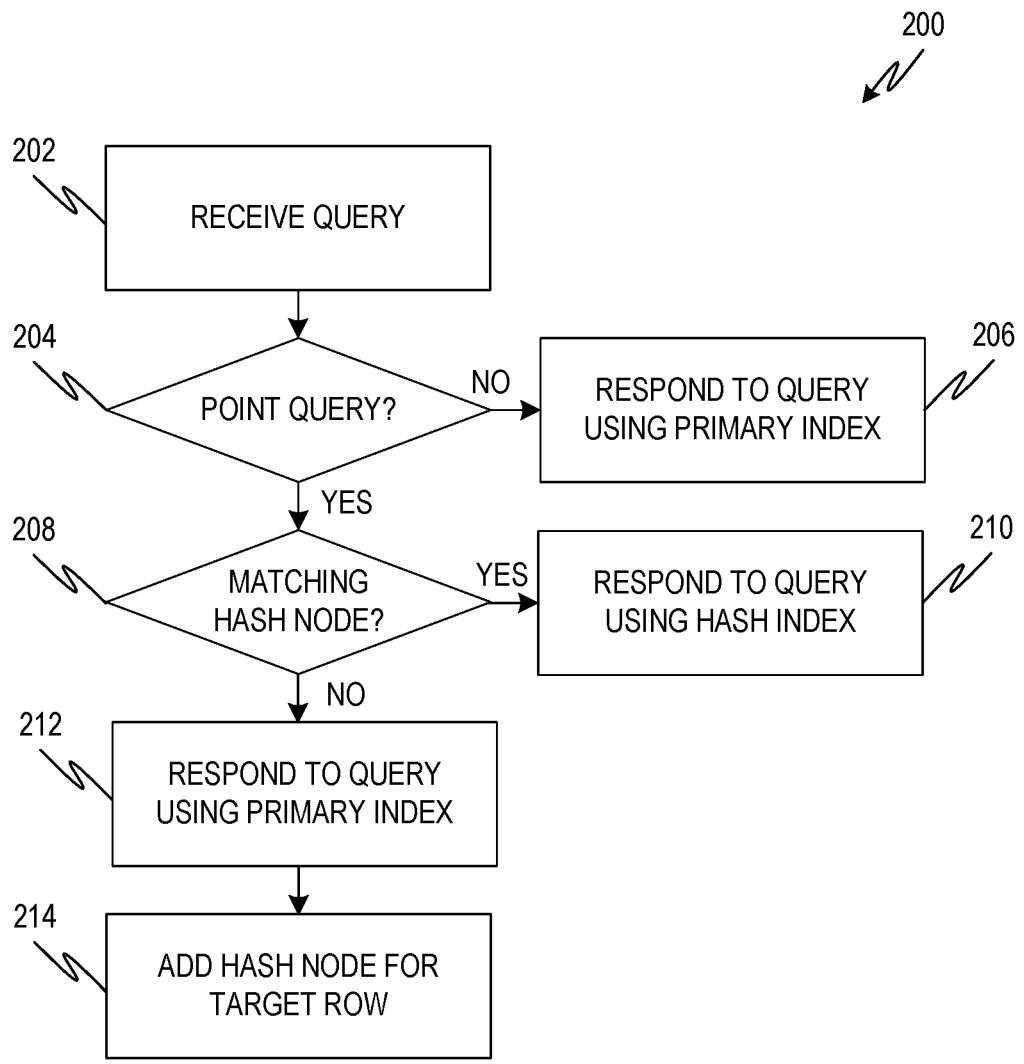
FIG. 2 is a flowchart showing one example of a process flow that may be executed by a database management system of FIG. 1 to respond to a query utilizing a hash index and a primary index organized according to the same index field.

Before describing the hash index auto-tuning system 118 in more detail, additional description of hash indexing is provided. FIG. 2 is a flowchart showing one example of a process flow 200 that may be executed by the database management system 102 (e.g., the query handler 116 thereof) to respond to a query 108 utilizing the hash index 114 and a primary index 112 organized according to the same index field.

At operation 202, the database management system 102 receives the query 108. At operation 204, the database management system 102 determines whether the query 108 is a point query. As described herein, the hash index 114 may be suitable for handling point queries, but not for handling other kinds of queries. If the query 108 is not a point query, the database management system 102 responds to the query 108 using the primary index 112 at operation 206.

If the query 108 is a point query, the database management system 102 determines, at operation 208, whether there is a hash node at the hash table 128 matching an index key indicated by the query 108. A hash node at the hash table 128 may match the index key if the index key maps to a hash node that is present at the hash table 128. If there is a matching hash node, the database management system 102 responds to the query 108 using the hash index 114 at operation 210. For example, if the matching hash node includes a pointer 130 to one or more records 120A-J, the database management system 102 returns the record or records indicated by the pointer 130. If the matching hash node does not include any pointers 130 (or does not include any pointers 130 associated with the index key), the database management system 102 returns none, indicating that there are no records 120A-J that include the index key as an index field value.

If there is no matching hash node at operation 208, the database management system 102, at operation 212, responds to the query 108 utilizing the primary index 112. At operation 214, the database management system 102 adds a new hash node to the hash table 128 where the index key used for the query 108 maps to the new hash node.

In some examples, the hash index 114 is configured to allow for collisions between index keys. A collision occurs when two different index keys map to the same hash value. This can occur, for example, if the hash function generates the same hash value for two different index keys. Various strategies may be used to handle collisions at the hash index 114. In some examples, a hash node may be configured for more than one index key. For example, the hash node may include index key data for multiple index keys. The index key data for a particular index key may include or reference one or more pointers 130 to records 120A-J including the index key for the index key value. If no records 120A-J include the index key for the index key value, this may also be indicated by the index key data. In this arrangement, the database management system 102 determines whether there is a matching hash node for an index key by mapping the index key to a hash node and determining that there is index key data for that index key at the mapped-to hash node.

Figure 3:
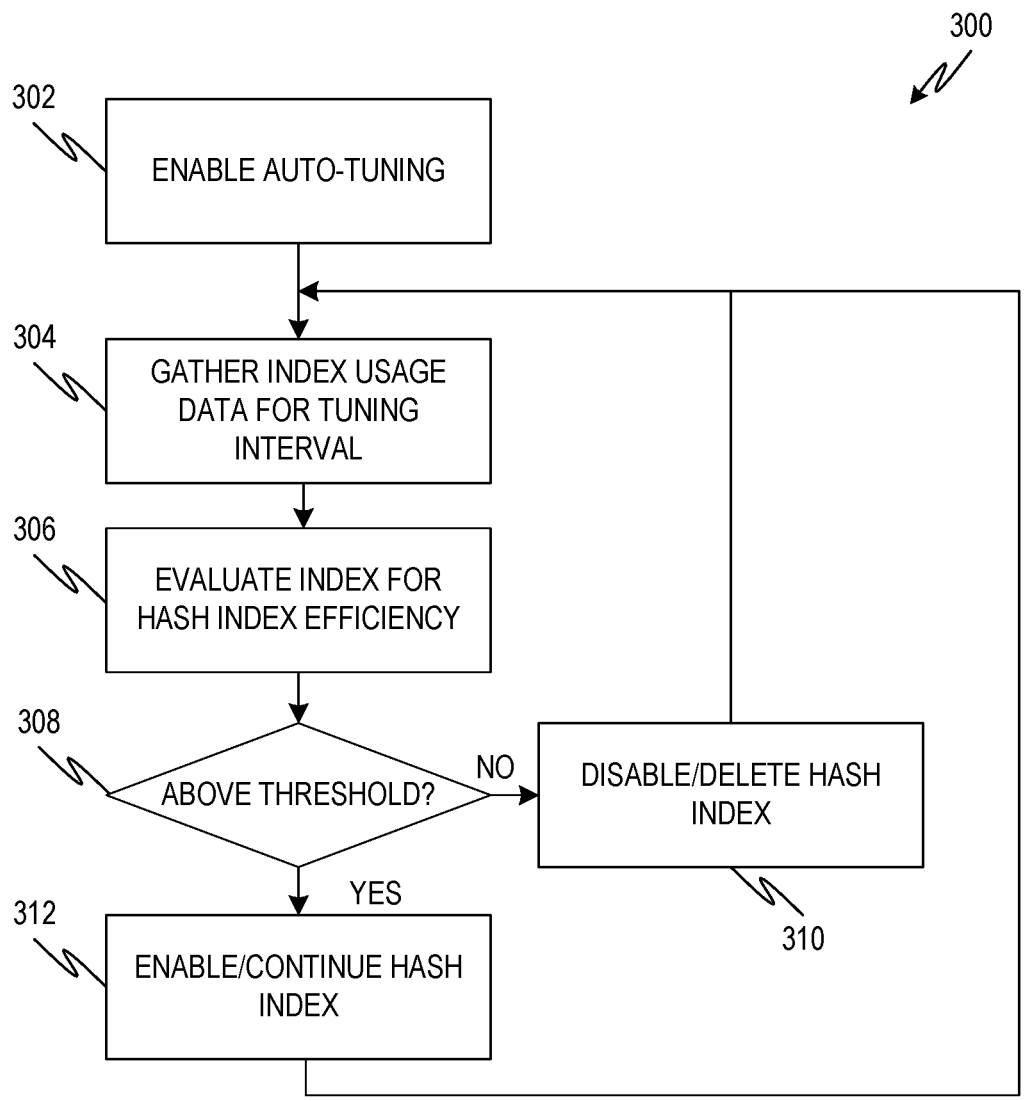
FIG. 3 is a flowchart showing one example of a process flow that may be executed by the database management system to auto-tune index hashing for an index.

FIG. 3 is a flowchart showing one example of a process flow 300 that may be executed by the database management system 102 (e.g., the hash index auto-tuning system 118 thereof) to auto-tune index hashing for an index. For example, the process flow 300 may be executed with respect to a primary index, such as the primary index 112, to automatically enable and/or disable the hash index 114 depending, for example, on whether use of the hash index 114 adds efficiency to query processing.

At operation 302, the database management system 102 enables hash index auto-tuning for the primary index 112. For example, the database management system 102 may receive an indication that hash index auto-tuning is to be enabled. For example, an administrator or other user of the database management system 102 may provide the indication that hash index auto-tuning is to be enabled, for example, by turning on a corresponding configuration option of the database management system. Enabling hash index auto-tuning, in some examples, includes initializing a hash index auto-tuning task that performs some or all of the remaining operations of the process flow 300. In some examples, hash index auto-tuning may be enabled for primary indexes 112 on tables 110 having more than a threshold number of records. For example, if the primary index 112 describes only a small number of records, hash indexing is less likely to be efficient.

At operation 304, the database management system 102 gathers index usage data over a tuning interval. Index usage data may be gathered regarding a single index, such as the primary index 112, or regarding multiple indexes describing the same table 110 or different tables. The tuning interval may be any suitable interval including, for example, a number of queries (e.g., 500 queries), a predetermined period of time, etc.

In some examples, the type of index usage data gathered for an index, such as the primary index 112, depends upon whether hash indexing is enabled. Hash indexing may be enabled, for example, if a hash index 114 is present and if the hash index 114 is active. (For example, as described herein, hash indexing may be frozen in some instances.) When hash indexing is disabled for the primary index 112, the database management system 102 may gather index usage data including, for example, (i) the total number of queries run on the primary index 112 during the tuning interval; (ii) the portion of those queries that are point queries; and (iii) the number of records in the table 110.

When hash indexing is enabled for the primary index 112, the database management system 102 may gather index usage data including, for example: (i) the total number of queries run on the primary index 112 or on the hash index 114 together during the tuning interval; (ii) the total number of point queries run on the primary index 112 or on the hash index 114 during the tuning interval; (iii) the total number of data rows in the table 110 described by the indexes 112, 114; (iv) the total number of times that the hash index 114 is used during the tuning interval; (v) the total number of times that a matching hash node is found in the hash index 114 during the tuning interval; and (vi) the total number of times that hash indexing has been disabled for the primary index 112.

In some examples, the database management system 102 begins a tuning interval for the primary index 112 with hash indexing disabled or not yet enabled. This may continue, for example, until or unless the database management system 102 receives a point query that could be processed using the hash index 114. When such a point query is received, the database management system 102 enables hash indexing. Enabling hash indexing may include, for example, allocating memory for the hash table 128 and/or pointers 130, initializing the hash table 128, linking the hash index 114 to the primary index 112, etc. After hash indexing is enabled, additional index usage data may be gathered describing usage of the hash index 114 as well as the primary index 112, for example, as described herein. The database management system 102 may continue with hash indexing enabled for the remainder of the tuning interval.

At operation 306, the database management system 102 finds a hash index efficiency for the primary index 112 based at least in part on the index usage data gathered during the tuning interval. This may be performed in any suitable manner. In some examples, the hash index efficiency for the primary index 112 is or is based at least in part on a rate of point queries directed to the primary index 112. For example, the higher the point query rate, the more likely there is to be an efficiency gain from using the hash index 114. A current point query rate may be found, for example, according to Equation [1] below:

$$\text{cur\_point\_query\_rate} = \frac{\text{number\_point\_queries}}{\text{number\_index\_used}} \quad [1]$$

In Equation [1], cur_point_query_rate is the current rate of point queries. The variable number_point_queries is the number of point queries directed to the primary index 112 (and/or the hash index 114, if enabled) during the most recent tuning interval. The variable number_index_used is the number of queries directed to the primary index 112 (and/or the hash index 114, if enabled) during the most recent tuning interval.

In some examples, hash index efficiency for the primary index 112 is based at least in part on a current hash table hit rate. The current hash table hit rate may be found for a primary index 112 that has a corresponding hash index 114 enabled and may describe the portion of queries directed to the hash index 114 that find a matching hash node at the hash table 128. As described herein, when the database management system 102 finds a matching hash node for a query index key at the hash table 128, it may be able to respond to the query using the hash index 114 (e.g., without using the primary index 112). In some examples, the current hash table hit rate is given by Equation [2] below:

$$\text{cur\_hash\_table\_hit\_rate} = \frac{\text{number\_matching\_hash\_nodes}}{\text{number\_hash\_table\_searched}} \quad [2]$$

In Equation [2], cur_hash_table_hit_rate is the current hash table hit rate. The variable number_matching_hash_nodes is the number of times that the hash index 114 produced a matching hash node for a query. The variable number_hash_table_searched is the number of times that the hash table 128 of the hash index 114 was searched.

In some examples, the hash index efficiency may be based at least in part on a memory-adjusted point query rate and/or a memory-adjusted hash table hit rate. Memory-adjusted rates may consider index usage data from one or more tuning intervals before the current tuning interval. For example, Equation [3] below shows an example memory-adjusted point query rate over two tuning intervals (e.g., a current tuning interval and a last tuning interval):

$$\text{MA\_point\_query\_rate} = (\text{last\_point\_query\_rate} \times \sigma) + (\text{current\_point\_query\_rate} \times (1-\sigma)) \quad [3]$$

In Equation [3], MA_point_query_rate is the memory-adjusted point query rate. The variable last_point_query_rate is the point query rate from the last expired tuning interval. For example, the last point query rate may be found from index usage data gathered during the last tuning interval. The last point query rate may be determined, for example, using Equation [1] above. The variable current_point_query_rate is the point query rate from index usage data gathered during the current or most recent tuning interval. The current point query rate may also be determined, for example, using Equation [1] above. In Equation [3], $\sigma$ is a memory weighting describing the degree to which the last point query rate factors in the memory-adjusted point query rate. In some examples, the memory weighting σ takes any value between zero and one. In some examples, the memory weighting σ is 0.2.

Equation [4] below shows an example memory-adjusted hash table hit rate over two tuning intervals, the current tuning interval and a last tuning interval:

$$MA\_hash\_table\_hit\_rate = (last\_hash\_table\_hit\_rate \times \sigma) + (current\_hash\_table\_hit\_rate \times (1\sigma)) \quad [4]$$

In Equation [4], MA_hash_table_hit_rate is the memory-adjusted hash table hit rate. The variable last_hash_table_hit_rate is the hash table hit rate from the last expired tuning interval. For example, the last hash table hit rate may be found from index usage data gathered during the last tuning interval. The last hash table hit rate may be determined, for example, using Equation [2] above. The variable current_hash_table_hit_rate is the hash table hit rate from index usage data gathered during the current or most recent tuning interval. The current hash table hit rate may also be determined, for example, using Equation [2] above. As with Equation [3], in Equation [4], σ is a memory weighting. Although Equations [3] and [4] show rates over two tuning intervals (e.g., the two most recent tuning intervals), any suitable number of tuning intervals may be considered to generate memory-adjusted rates.

At operation 308, the database management system 102 determines if the hash index efficiency of the primary index 112 is above a threshold value. If so, then hash indexing for the primary index 112 may, at operation 312, be enabled and/or continue if it was previously enabled. Optionally, after enabling or continuing hash indexing at operation 312, the database management system 102 returns to operation 304 to gather index usage data for the next tuning interval. If at operation 308 the hash index efficiency is not above the threshold value, then hash indexing for the primary index 112 may be disabled at operation 310. Disabling the hash indexing may include pausing hash indexing for one or more tuning intervals and/or deleting the hash index 114, as described herein. Optionally, after disabling or deleting the hash index 114 at operation 310, the database management system 102 returns to operation 304 to gather index usage data for the next tuning interval.

Determining whether the hash index efficiency of the primary index 112 is above the threshold may be performed in any suitable manner. In some examples, the hash index efficiency of the primary index 112 is above the threshold if a point query rate for the primary index 112 is above a threshold point query rate or if a hash table hit rate for the primary index 112 is above a threshold hash table hit rate. The threshold point query rate and the threshold hash table hit rate may be the same or different. The point query rate and/or hash table hit rate may be for the most recent tuning interval or may be memory-adjusted over two or more tuning intervals, as described herein. In an alternative example, the database management system 102 determines that the hash index efficiency for the primary index 112 is above the threshold only if both the point query rate is above a point query rate threshold and the hash table hit rate is above a hash table hit rate threshold. Also, in some examples, the hash index efficiency of the primary index 112 is determined considering the point query rate alone and/or the hash table hit rate alone, for example, by calculating one rate but not the other.

Figure 4:
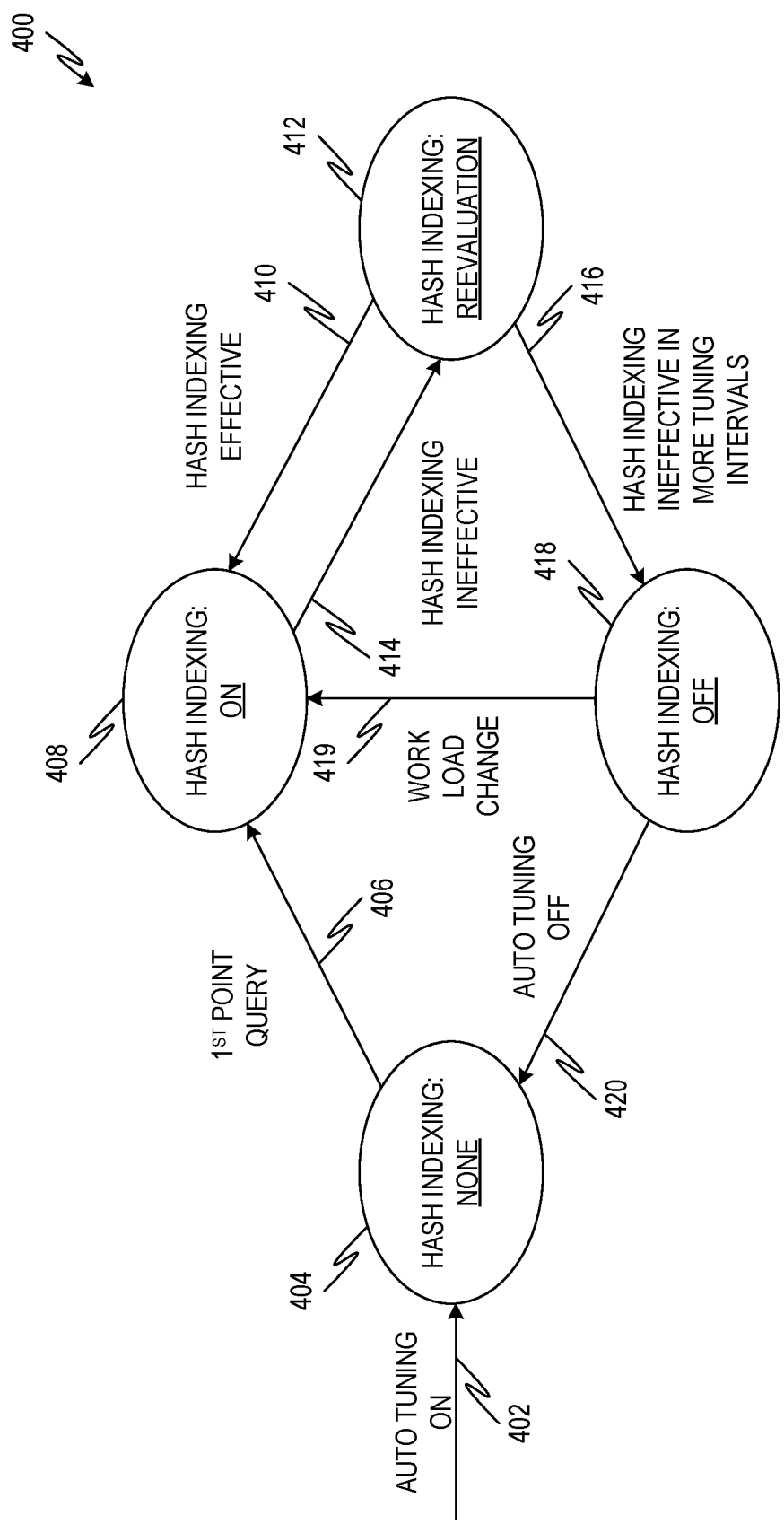
FIG. 4 is a state diagram showing one example way of executing the process flow of FIG. 3.

FIG. 4 is a state diagram 400 showing one example way of executing the process flow 300 of FIG. 3 to perform auto-tuning for hash indexing. States 404, 408, 412, and 418 described with respect to FIG. 4 are described as states of the primary index 112. That is, the states 404, 408, 412, 418 describe the way that the database management system 102 handles queries that use the primary index 112 (e.g., queries that include an index field value for the index field associated with the primary index 112). Auto-tuning is turned on (path 402), placing the system at the state 404. At the state 404, auto hash indexing is enabled and no hash index 114 is in use. At the state 408, the hash index 114 is present and in use. At the state 412, the hash index 114 is present and may be in use. At the state 418, hash indexing is turned off and, optionally, the hash index 114 is deleted from memory.

When hash index auto-tuning is turned on, the primary index 112 may initially enter the state 404 with no hash indexing and begin collecting index usage data over a first tuning interval. If a first point query is received, the database management system 102 transitions (path 406) to the state 408 in which hash indexing is on. The path 406 from the state 404 to the state 408, in some examples, occurs in the middle of a tuning interval.

At the state 408, the database management system 102 continues to gather index usage data until the end of a tuning interval, as in operation 304. After the tuning interval, the database management system 102 determines the hash index efficiency of the primary index 112, as in operation 306, and determines if the hash index efficiency is greater than or less than the threshold, as in operation 308. If the hash index efficiency is greater than the threshold, then the primary index 112 remains at the state 408 for another tuning interval. If the hash index efficiency is less than the threshold, then the primary index 112 transitions (path 414) to the state 412. In some examples, the primary index 112 remains in the state 408 until or unless the hash index efficiency is less than the threshold for more than a predetermined number of times.

At the state 412, hash indexing is reevaluated. The database management system 102 may complete one or more cycles of gathering index usage data for a tuning interval (operation 304), evaluating the hash index efficiency of the primary index 112 (operation 306), and determining whether the hash index efficiency is greater than the threshold (operation 308). If the hash index efficiency is greater than the threshold for more than a number of tuning intervals, the primary index 112 may transition back to the state 408 (path 410). On the other hand, if the hash index efficiency is less than the threshold for more than a number of tuning intervals, the primary index 112 may transition (path 416) to the state 418. The number of tuning intervals for which the hash index efficiency is greater than the threshold before the path 410 occurs may be any suitable number. Similarly, the number of tuning intervals for which the hash index efficiency is less than the threshold before the path 416 occurs may be any suitable number, the same as or different from the number for the path 410. The database management system 102 continues to use the hash index 114 during the reevaluation state 412.

From the state 418, the primary index 112 may remain until auto-tuning is turned off, at which point the primary index 112 may return to the state 404 (path 420) until hash index auto-tuning is enabled again. In some examples, the primary index 112 may return to the hash indexing "on" state 408 (path 419). For example, if while in the state 418, the database management system 102 may detect that the work load on the primary index 112 has changed in a way that makes hash indexing advantageous. For example, if the number of point queries received in one or more recent tuning intervals increases or another change to the primary index 112 work load indicates that hash indexing may be advantageously used, the primary index 112 returns to the state 408.

Figure 5:
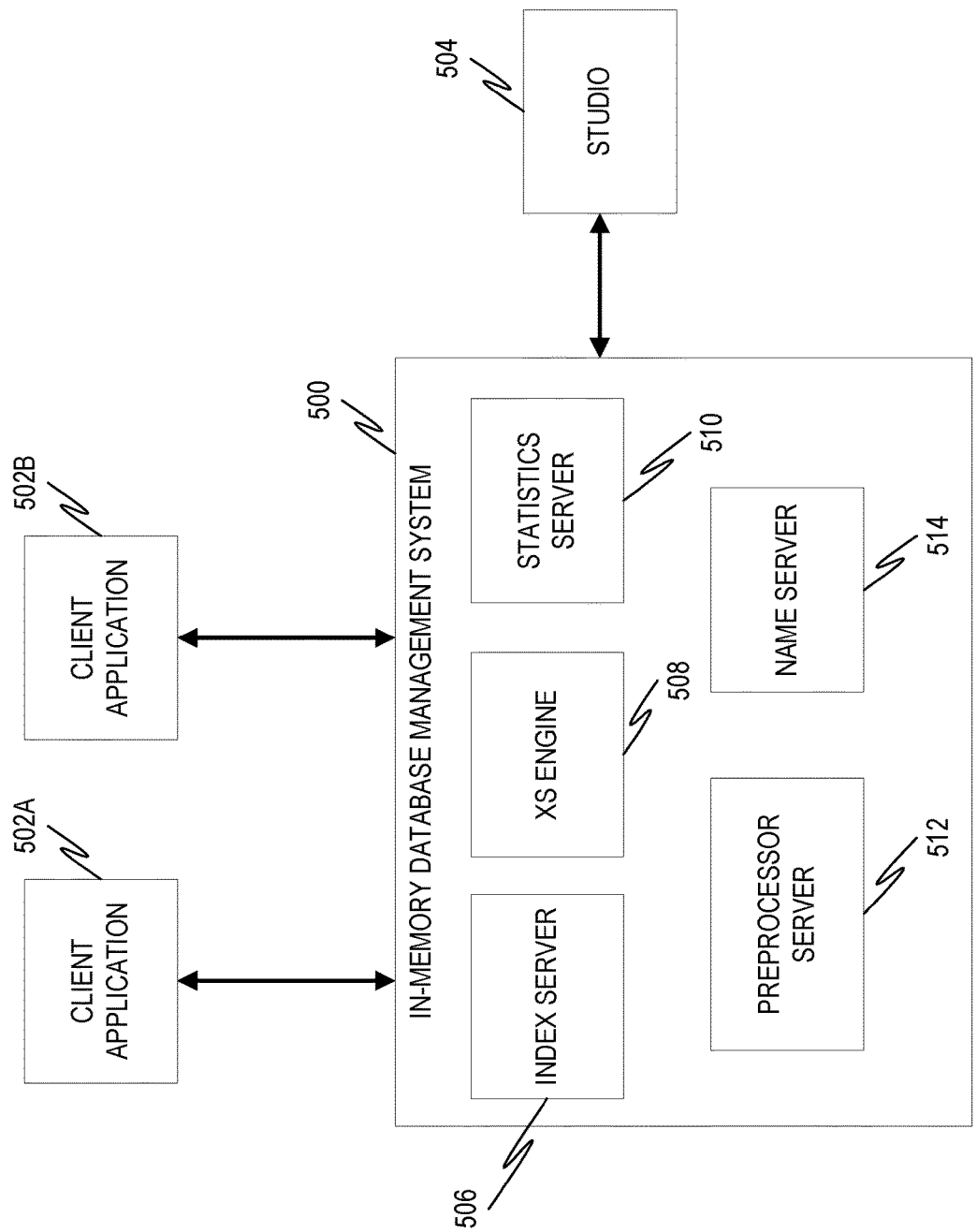
FIG. 5 is a diagram illustrating an example of an in-memory database management system that may utilize hash index auto-tuning, as described herein.
Figure 6:
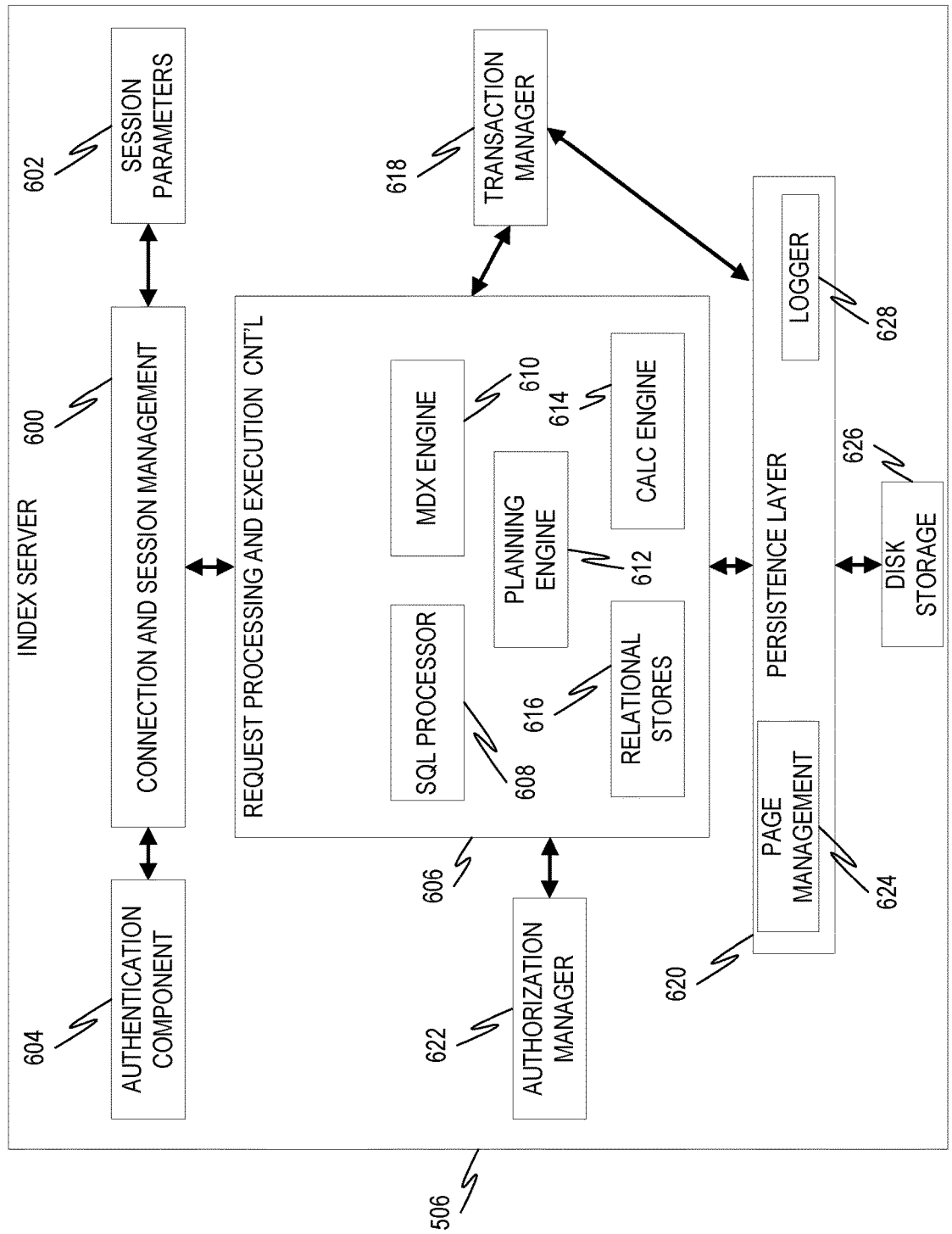
FIG. 6 is a diagram illustrating an example of the index server of FIG. 5.
Figure 7:
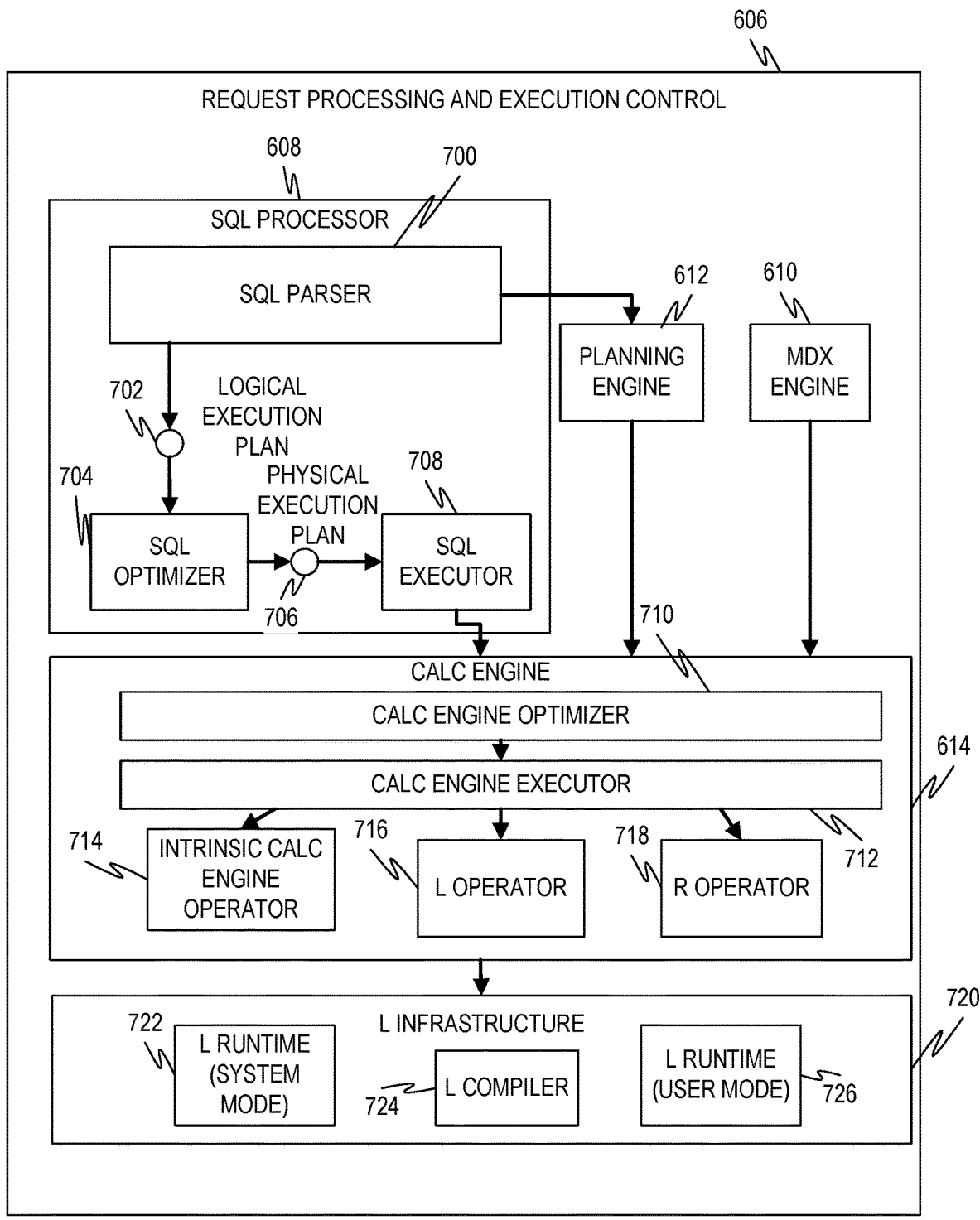
FIG. 7 is a diagram illustrating one example of a request processing and execution control of FIG. 6.

FIG. 5 is a diagram illustrating an example of an in-memory database management system 500 that may utilize hash index auto-tuning, as described herein. An in-memory database stores data primarily at a main memory, such as a random access memory (RAM). This is different from databases that primarily employ a disk storage mechanism. In some examples, the in-memory database management system 500 may be or include an example of the HANA system from SAP SE of Walldorf, Germany. Although various features of web applications are described herein in the context of an in-memory database, hash index auto-tuning, as described herein, may be generally implemented for any type of database management system such as, for example, in the VORA system, also from SAP SE of Walldorf, Germany, or the SAP ASE system, also from SAP SE of Walldorf, Germany, etc. Also, although the examples of FIGS. 5-7 show an example in-memory database management system, the hash index auto-tuning described herein may be used in any suitable database management system.

The in-memory database management system 500 may be coupled to one or more client applications 502A, 502B. For example, the client applications 502A, 502B may be examples of the client applications 104A, 104B or other client applications. The client applications 502A, 502B may execute one or more queries utilizing data from the database, including, for example, presenting a user interface (UI) to one or more users, entering data, accessing data, etc. The client applications 502A, 502B may communicate with the in-memory database management system 500 through a number of different protocols, including Structured Query Language (SQL), Multidimensional Expressions (MDX), Hypertext Transfer Protocol (HTTP), Representational State Transfer (REST), and Hypertext Markup Language (HTML).

FIG. 5 also shows a studio 504 that may be used to perform modeling by accessing the in-memory database management system 500. In some examples, the studio 504 may allow complex analysis to be performed on data drawn not only from real-time event data and windows, but also from stored database information.

The in-memory database management system 500 may comprise a number of different components, including an index server 506, an XS engine 508, a statistics server 510, a preprocessor server 512, and a name server 514. These components may operate on a single computing device or may be spread among multiple computing devices (e.g., separate servers). The index server 506 contains the actual data and the engines for processing the data. It may also coordinate and use the other servers.

The XS engine 508 allows clients to connect to the in-memory database management system 500 using web protocols, such as HTTP. Although the XS engine 508 is illustrated as a component of the in-memory database management system 500, in some examples, the XS engine 508 may be implemented as one or more application programming interfaces (APIs) and/or services positioned between the client applications 502A, 502B and the in-memory database management system 500. For example, the XS engine 508 may be configured to process client requests received in languages other than SQL such as, for example, MDX, HTTP, REST, HTML, etc.

The statistics server 510 collects information about status, performance, and resource consumption from all of the other server components. The statistics server 510 can be accessed from the studio 504 to obtain the status of various alert monitors.

The preprocessor server 512 is used for analyzing text data and extracting information on which text search capabilities are based.

The name server 514 holds information about the database topology. This is used in a distributed system with instances of the database on different hosts. The name server 514 knows where the components are running and which data is located on which server. In an example embodiment, a separate enqueue server may operate in the manner described above with respect to enqueue servers, specifically with regard to creating and managing light-weight enqueue sessions.

FIG. 6 is a diagram illustrating an example of the index server 506. Specifically, the index server 506 of FIG. 5 is depicted in more detail. The index server 506 includes a connection and session management component 600, which is responsible for creating and managing sessions and connections for the database clients (e.g., client applications 502A, 502B). Once a session is established, clients can communicate with the in-memory database management system 500 using SQL statements. For each session, a set of session parameters 602 may be maintained, such as auto-commit, current transaction isolation level, etc. Users (e.g., system administrators, developers) may be authenticated by the in-memory database management system 500 itself (e.g., by logging in with log-in information such as a user name and password, using an authentication component 604), or authentication can be delegated to an external authentication provider such as a Lightweight Directory Access Protocol (LDAP) directory.

Client queries can be analyzed and executed by a set of components summarized as request processing and execution control 606. An SQL processor 608 checks the syntax and semantics of the client SQL statements and generates a logical execution plan. MDX is a language for querying and manipulating multidimensional data stored in online analytical processing (OLAP) cubes. As such, an MDX engine 610 may be provided to allow for the parsing and executing of MDX commands. A planning engine 612 allows applications to execute basic planning operations in the database layer. One such operation is to create a new version of a dataset as a copy of an existing dataset, while applying filters and transformations.

A calculation engine 614 implements the various SQL script and planning operations. The calculation engine 614 creates a logical execution plan for calculation models derived from SQL script, MDX, planning, and domain-specific models. This logical execution plan may include, for example, breaking up a model into operations that can be processed in parallel. The data is stored in relational stores 616, which implement a relational database in main memory. Each SQL statement may be processed in the context of a transaction. New sessions are implicitly assigned to a new transaction. A transaction manager 618 coordinates database transactions, controls transactional isolation, and keeps track of running and closed transactions. When a transaction is committed or rolled back, the transaction manager 618 informs the involved engines about this event so they can execute needed actions. The transaction manager 618 also cooperates with a persistence layer 620 to achieve atomic and durable transactions.

An authorization manager 622 is invoked by other database system components to check whether the user has the specified privileges to execute the requested operations. The in-memory database management system 500 allows for the granting of privileges to users or roles. A privilege grants the right to perform a specified operation on a specified object.

The persistence layer 620 ensures that the database is restored to the most recent committed state after a restart and that transactions are either completely executed or completely undone. To achieve this goal in an efficient way, the persistence layer 620 uses a combination of write-ahead logs, shadow paging, and save points. The persistence layer 620 also offers a page management interface 624 for writing and reading data to and from a separate disk storage 626, and also contains a logger 628 that manages the transaction log. Log entries can be written implicitly by the persistence layer 620 when data is written via the persistence interface or explicitly by using a log interface.

FIG. 7 is a diagram illustrating one example of the request processing and execution control 606. This diagram depicts the request processing and execution control 606 of FIG. 6 in more detail. The SQL processor 608 contains an SQL parser 700, which parses the SQL statement and generates a logical execution plan 702, which it passes to an SQL optimizer 704. The SQL optimizer 704 optimizes the logical execution plan 702 and converts it to a physical execution plan 706, which it then passes to a SQL executor 708. The calculation engine 614 implements the various SQL script and planning operations, and includes a calc engine optimizer 710, which optimizes the operations, and a calc engine executor 712, which executes the operations, as well as an intrinsic calc engine operator 714, an L operator 716, and an R operator 718. For example, the calc engine optimizer 710 may be configured, as described herein, to optimize queries by considering null information to skip one or more expressions when another expression returns null.

An L infrastructure 720 includes a number of components to aid in the running of L procedures, including an L-runtime (system mode) 722, an L compiler 724, and an L-runtime (user mode) 726.

EXAMPLES

Example 1 is a system for managing hash indexing in a database management system, comprising: a database; and at least one hardware processor programmed by instructions to perform operations comprising: receiving, by the database management system, first index usage data for a first index describing a database; determining, by the database management system, a first hash index effectiveness for the first index based at least in part on the first index usage data; comparing, by the database management system, the first hash index effectiveness to a threshold hash index effectiveness; and modifying a hash index status of the first index, by the database management system, based at least in part on the comparing.

In Example 2, the subject matter of Example 1 optionally includes wherein the hardware processor is further programmed by instructions to perform operations comprising: receiving an instruction to enable hash index auto-tuning; receiving a first point query for processing with the first index; and after receiving the first point query, generating a first hash index associated with the first index, wherein at least a portion of the first index usage data is generated after generating the first hash index.

In Example 3, the subject matter of any one or more of Examples 1-2 optionally includes wherein the first hash index effectiveness is greater than the threshold hash index effectiveness, and wherein modifying the hash index status of the first index comprises generating a first hash index associated with the first index.

In Example 4, the subject matter of any one or more of Examples 1-3 optionally includes wherein the first hash index effectiveness is less than the threshold hash index effectiveness, and wherein modifying the hash index status of the first index comprises pausing use of a first hash index associated with the first index, wherein the hardware processor is further programmed by instructions to perform operations comprising: receiving, by the database management system, second index usage data for the first index captured after the pausing use of the first hash index; determining, by the database management system, a second hash index effectiveness for the first index based at least in part on the second index usage data; comparing, by the database management system, the second hash index effectiveness to the threshold hash index effectiveness; and modifying the hash index status of the first index, by the database management system, based at least in part on the comparing of the second hash index effectiveness to the threshold hash index effectiveness.

In Example 5, the subject matter of Example 4 optionally includes wherein the second hash index effectiveness is greater than the threshold hash index effectiveness, further comprising resuming use of the first hash index associated with the first index.

In Example 6, the subject matter of any one or more of Examples 4-5 optionally includes wherein the second hash index effectiveness is less than the threshold hash index effectiveness, further comprising deleting the first hash index.

In Example 7, the subject matter of any one or more of Examples 1-6 optionally includes wherein determining the first hash index effectiveness comprises determining a portion of a set of queries indicating the first index that are point queries.

In Example 8, the subject matter of any one or more of Examples 1-7 optionally includes wherein determining the first hash index effectiveness comprises determining a portion of a set of point queries indicating the first index for which a matching hash node is found at a hash index associated with the first index.

Example 9 is a method for managing hash indexing in a database management system, comprising: receiving, by the database management system, first index usage data for a first index describing a database; determining, by the database management system, a first hash index effectiveness for the first index based at least in part on the first index usage data; comparing, by the database management system, the first hash index effectiveness to a threshold hash index effectiveness; and modifying a hash index status of the first index, by the database management system, based at least in part on the comparing.

In Example 10, the subject matter of Example 9 optionally includes receiving an instruction to enable hash index auto-tuning; receiving a first point query for processing with the first index; and after receiving the first point query, generating a first hash index associated with the first index, wherein at least a portion of the first index usage data is generated after generating the first hash index.

In Example 11, the subject matter of any one or more of Examples 9-10 optionally includes wherein the first hash index effectiveness is greater than the threshold hash index effectiveness, and wherein modifying the hash index status of the first index comprises generating a first hash index associated with the first index.

In Example 12, the subject matter of any one or more of Examples 9-11 optionally includes wherein the first hash index effectiveness is less than the threshold hash index effectiveness, and wherein modifying the hash index status of the first index comprises pausing use of a first hash index associated with the first index, further comprising: receiving, by the database management system, second index usage data for the first index captured after the pausing use of the first hash index; determining, by the database management system, a second hash index effectiveness for the first index based at least in part on the second index usage data; comparing, by the database management system, the second hash index effectiveness to the threshold hash index effectiveness; and modifying the hash index status of the first index, by the database management system, based at least in part on the comparing of the second hash index effectiveness to the threshold hash index effectiveness.

In Example 13, the subject matter of Example 12 optionally includes wherein the second hash index effectiveness is greater than the threshold hash index effectiveness, further comprising resuming use of the first hash index associated with the first index.

In Example 14, the subject matter of any one or more of Examples 12-13 optionally includes wherein the second hash index effectiveness is less than the threshold hash index effectiveness, further comprising deleting the first hash index.

In Example 15, the subject matter of any one or more of Examples 9-14 optionally includes wherein determining the first hash index effectiveness comprises determining a portion of a set of queries indicating the first index that are point queries.

In Example 16, the subject matter of any one or more of Examples 9-15 optionally includes wherein determining the first hash index effectiveness comprises determining a portion of a set of point queries indicating the first index for which a matching hash node is found at a hash index associated with the first index.

Example 17 is a machine-readable medium comprising instructions thereon that, when executed by at least one processor, cause the at least one processor to perform operations comprising: receiving, by a database management system, first index usage data for a first index describing a database; determining, by the database management system, a first hash index effectiveness for the first index based at least in part on the first index usage data; comparing, by the database management system, the first hash index effectiveness to a threshold hash index effectiveness; and modifying a hash index status of the first index, by the database management system, based at least in part on the comparing.

In Example 18, the subject matter of Example 17 optionally includes instructions thereon that, when executed by the at least one processor, cause the at least one processor to perform operations comprising: receiving an instruction to enable hash index auto-tuning; receiving a first point query for processing with the first index; and after receiving the first point query, generating a first hash index associated with the first index, wherein at least a portion of the first index usage data is generated after generating the first hash index.

In Example 19, the subject matter of any one or more of Examples 17-18 optionally includes wherein the first hash index effectiveness is greater than the threshold hash index effectiveness, and wherein modifying the hash index status of the first index comprises generating a first hash index associated with the first index.

In Example 20, the subject matter of any one or more of Examples 17-19 optionally includes wherein the first hash index effectiveness is less than the threshold hash index effectiveness, and wherein modifying the hash index status of the first index comprises pausing use of a first hash index associated with the first index, further comprising instructions thereon that, when executed by the at least one processor, cause the at least one processor to perform operations comprising: receiving, by the database management system, second index usage data for the first index captured after the pausing use of the first hash index; determining, by the database management system, a second hash index effectiveness for the first index based at least in part on the second index usage data; comparing, by the database management system, the second hash index effectiveness to the threshold hash index effectiveness; and modifying the hash index status of the first index, by the database management system, based at least in part on the comparing of the second hash index effectiveness to the threshold hash index effectiveness.

Figure 8:
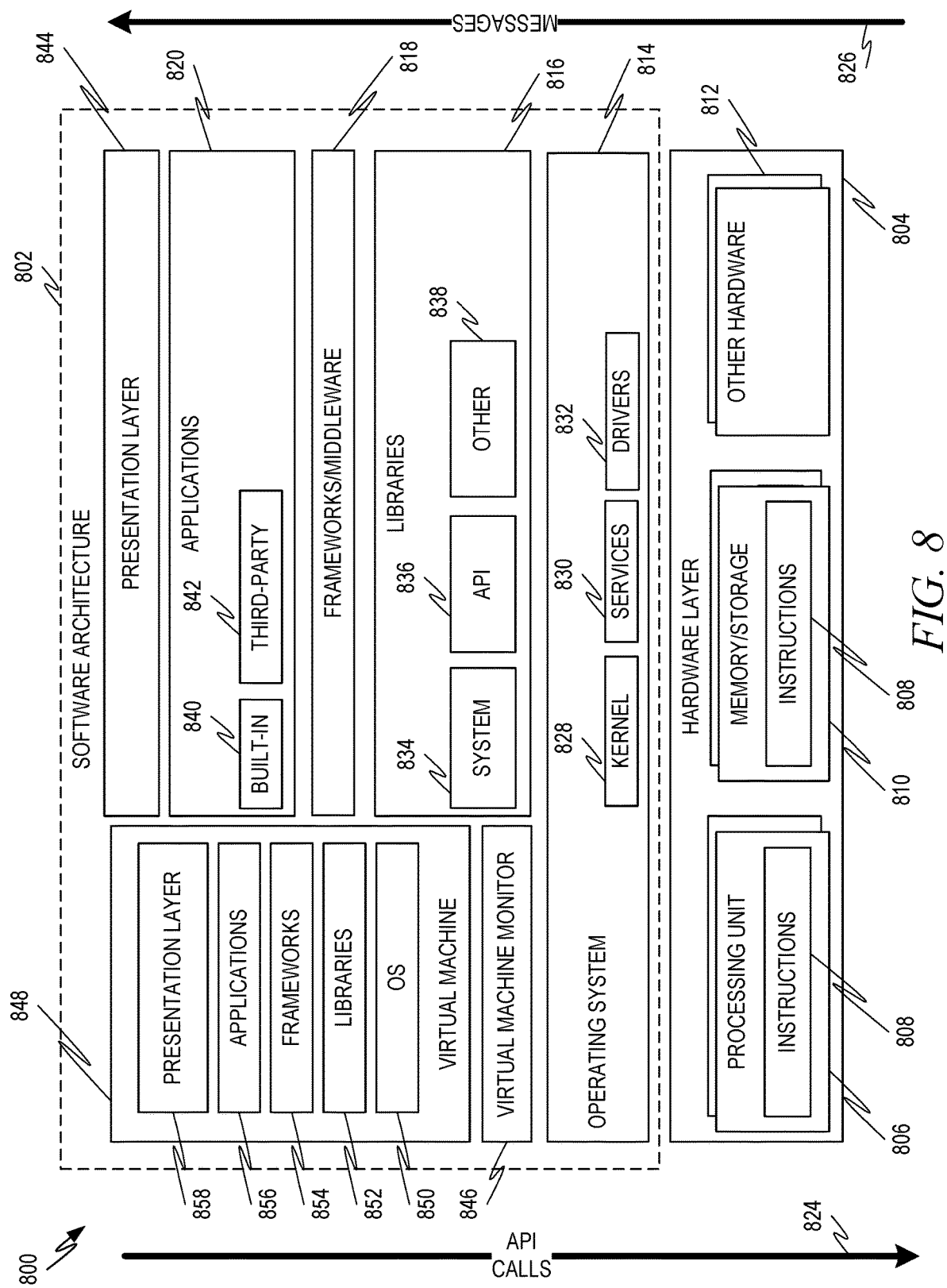
FIG. 8 is a block diagram showing one example of a software architecture for a computing device.

FIG. 8 is a block diagram 800 showing one example of a software architecture 802 for a computing device. The software architecture 802 may be used in conjunction with various hardware architectures, for example, as described herein. FIG. 8 is merely a non-limiting example of a software architecture and many other architectures may be implemented to facilitate the functionality described herein. A representative hardware layer 804 is illustrated and can represent, for example, any of the above referenced computing devices. In some examples, the hardware layer 804 may be implemented according to the architecture of a computer system 900 of FIG. 9.

The representative hardware layer 804 comprises one or more processing units 806 having associated executable instructions 808. The executable instructions 808 represent the executable instructions of the software architecture 802, including implementation of the methods, modules, subsystems, components, and so forth described herein. The hardware layer 804 may also include memory and/or storage modules 810, which also have the executable instructions 808. The hardware layer 804 may also comprise other hardware as indicated by other hardware 812, which represents any other hardware of the hardware layer 804, such as the other hardware illustrated as part of the computer system 900.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820, and a presentation layer 844. Operationally, the applications 820 and/or other components within the layers may invoke API calls 824 through the software stack and access a response, returned values, and so forth illustrated as messages 826 in response to the API calls 824. The layers illustrated are representative in nature and not all software architectures have all layers. For example, some mobile or special-purpose operating systems may not provide a frameworks/middleware 818 layer, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of an interrupt and, in response, cause the software architecture 802 to pause its current processing and execute an interrupt service routine (ISR) when an interrupt is accessed.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than by interfacing directly with the underlying operating system 814 functionality (e.g., kernel 828, services 830, and/or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules. In some examples, the libraries 816 may provide one or more APIs serviced by a message-oriented middleware.

The frameworks 818 (also sometimes referred to as middleware) may provide a higher-level common infrastructure that may be utilized by the applications 820 and/or other software components/modules. For example, the frameworks 818 may provide various graphic user interface (GUI) functions, high-level resource management, high-level location services, and so forth. The frameworks 818 may provide a broad spectrum of other APIs that may be utilized by the applications 820 and/or other software components/modules, some of which may be specific to a particular operating system or platform.

The applications 820 include built-in applications 840 and/or third-party applications 842. Examples of representative built-in applications 840 may include, but are not limited to, a contacts application, a browser application, a book reader application, a location application, a media application, a messaging application, and/or a game application. Third-party applications 842 may include any of the built-in applications 840 as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™ Android™, Windows® Phone, or other mobile computing device operating systems. In this example, the third-party application 842 may invoke the API calls 824 provided by the mobile operating system such as the operating system 814 to facilitate functionality described herein.

The applications 820 may utilize built-in operating system functions (e.g., kernel 828, services 830, and/or drivers 832), libraries (e.g., system libraries 834, API libraries 836, and other libraries 838), and frameworks/middleware 818 to create user interfaces to interact with users of the system. Alternatively, or additionally, in some systems interactions with a user may occur through a presentation layer, such as the presentation layer 844. In these systems, the application/module "logic" can be separated from the aspects of the application/module that interact with a user.

Some software architectures utilize virtual machines. In the example of FIG. 8, this is illustrated by a virtual machine 848. A virtual machine creates a software environment where applications/modules can execute as if they were executing on a hardware computing device. A virtual machine 848 is hosted by a host operating system (e.g., the operating system 814) and typically, although not always, has a virtual machine monitor 846, which manages the operation of the virtual machine 848 as well as the interface with the host operating system (e.g., the operating system 814). A software architecture executes within the virtual machine 848, such as an operating system 850, libraries 852, frameworks/middleware 854, applications 856, and/or a presentation layer 858. These layers of software architecture executing within the virtual machine 848 can be the same as corresponding layers previously described or may be different.

MODULES, COMPONENTS, AND LOGIC

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be programmed by instructions (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable hardware processors executing a computer program to perform functions by operating on input data and generating output. Method operations can also be performed by, and apparatus of example embodiments may be implemented as, special-purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 9:
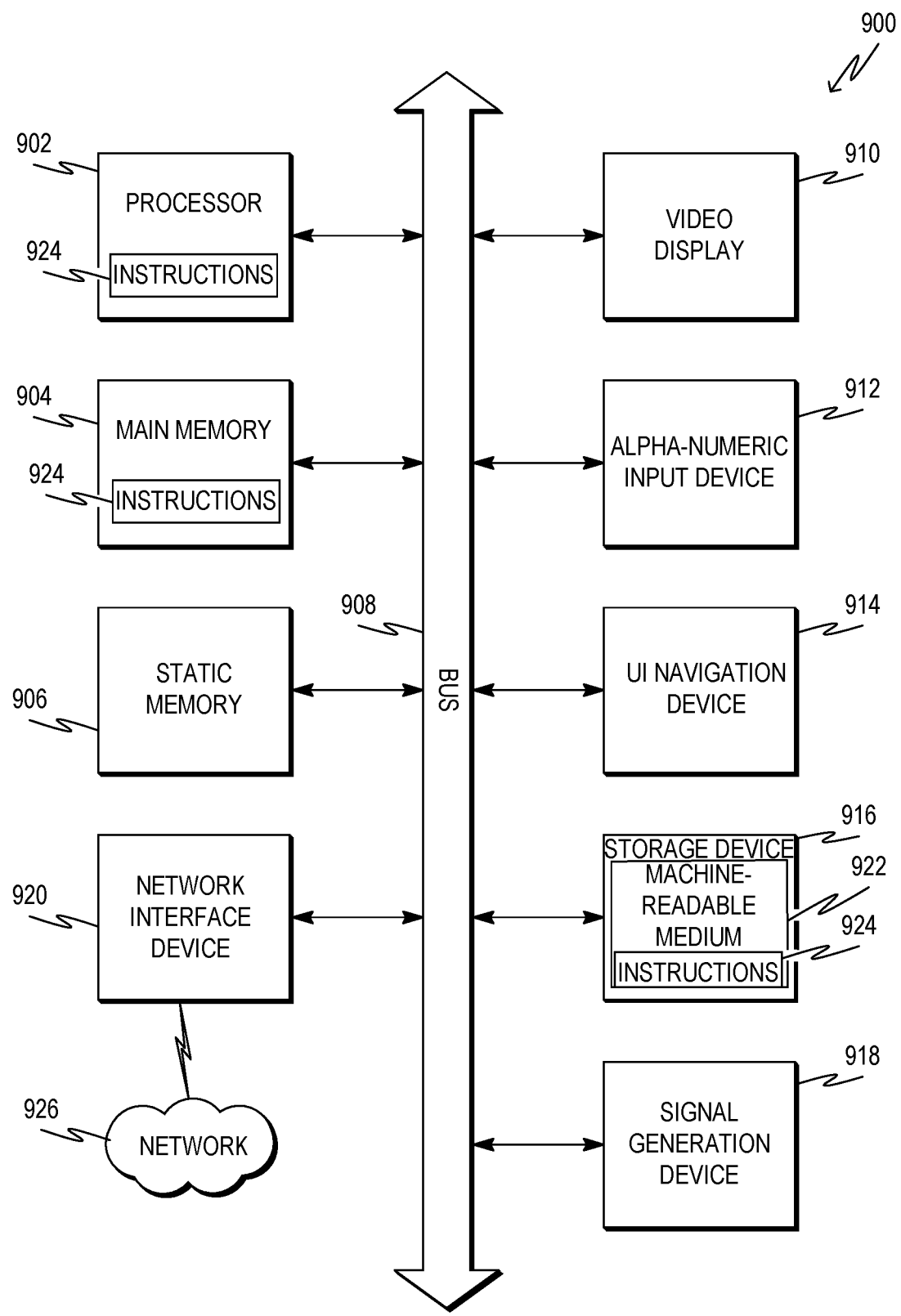
FIG. 9 is a block diagram of a machine in the example form of a computer system.

FIG. 9 is a block diagram of a machine in the example form of a computer system 900 within which instructions 924 may be executed for causing the machine to perform any one or more of the methodologies discussed herein. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, a network switch, a network bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a UI navigation (or cursor control) device 914 (e.g., a mouse), a disk drive or storage device 916, a signal generation device 918 (e.g., a speaker), and a network interface device 920.

Machine-Readable Medium

The disk drive device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media 922.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding, or carrying instructions 924 for execution by the machine and that cause the machine to perform any one or more of the methodologies of the present disclosure, or that is capable of storing, encoding, or carrying data structures utilized by or associated with such instructions 924. The term "machine-readable medium" shall accordingly be taken to include, but not be limited to, solid-state memories, and optical and magnetic media. Specific examples of machine-readable media 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network (LAN), a wide area network (WAN), the Internet, mobile telephone networks, plain old telephone service (POTS) networks, and wireless data networks (e.g., Wi-Fi and WiMax networks). The term "transmission medium" shall be taken to include any intangible medium that is capable of storing, encoding, or carrying instructions 924 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for managing hash indexing in a database management system, comprising:
    a database; and
    at least one hardware processor programmed by instructions to perform operations comprising:
        receiving, by the database management system, first index usage data for a first index describing a database, the first index usage data describing usage of the first index by the database management system;
        determining, by the database management system, a first hash index effectiveness for the first index based at least in part on the first index usage data;
        comparing, by the database management system, the first hash index effectiveness to a threshold hash index effectiveness; and
        modifying a hash index status of the first index, by the database management system, based at least in part on the comparing, the hash index status indicating whether the database management system utilizes a first hash index to process queries associated with the first index.

2. The system of claim 1, wherein the hardware processor is further programmed by instructions to perform operations comprising:
    receiving an instruction to enable hash index auto-tuning;
    receiving a first point query for processing with the first index; and
    after receiving the first point query, generating the first hash index, wherein at least a portion of the first index usage data is generated after generating the first hash index.

3. The system of claim 1, wherein the first hash index effectiveness is greater than the threshold hash index effectiveness, and wherein modifying the hash index status of the first index comprises generating the first hash index.

4. The system of claim 1, wherein the first hash index effectiveness is less than the threshold hash index effectiveness, and wherein modifying the hash index status of the first index comprises pausing use of the first hash, wherein the hardware processor is further programmed by instructions to perform operations comprising:
receiving, by the database management system, second index usage data for the first index captured after the pausing use of the first hash index;
determining, by the database management system, a second hash index effectiveness for the first index based at least in part on the second index usage data;
comparing, by the database management system, the second hash index effectiveness to the threshold hash index effectiveness; and
modifying the hash index status of the first index, by the database management system, based at least in part on the comparing of the second hash index effectiveness to the threshold hash index effectiveness.

5. The system of claim 4, wherein the second hash index effectiveness is greater than the threshold hash index effectiveness, further comprising resuming use of the first hash index associated with the first index.

6. The system of claim 4, wherein the second hash index effectiveness is less than the threshold hash index effectiveness, further comprising deleting the first hash index.

7. The system of claim 1, wherein determining the first hash index effectiveness comprises determining a portion of a set of queries indicating the first index that are point queries.

8. The system of claim 1, wherein determining the first hash index effectiveness comprises determining a portion of a set of point queries indicating the first index for which a matching hash node is found at a hash index associated with the first index.

9. A method for managing hash indexing in a database management system, comprising:
receiving, by the database management system, first index usage data for a first index describing a database, the first index usage data describing usage of the first index by the database management system;
determining, by the database management system, a first hash index effectiveness for the first index based at least in part on the first index usage data;
comparing, by the database management system, the first hash index effectiveness to a threshold hash index effectiveness; and
modifying a hash index status of the first index, by the database management system, based at least in part on the comparing, the hash index status indicating whether the database management system utilizes a first hash index to process queries associated with the first index.

10. The method of claim 9, further comprising:
receiving an instruction to enable hash index auto-tuning;
receiving a first point query for processing with the first index; and
after receiving the first point query, generating the first hash index, wherein at least a portion of the first index usage data is generated after generating the first hash index.

11. The method of claim 9, wherein the first hash index effectiveness is greater than the threshold hash index effectiveness, and wherein modifying the hash index status of the first index comprises generating the first hash index.

12. The method of claim 9, wherein the first hash index effectiveness is less than the threshold hash index effectiveness, and wherein modifying the hash index status of the first index comprises pausing use of the first hash index, further comprising:
receiving, by the database management system, second index usage data for the first index captured after the pausing use of the first hash index;
determining, by the database management system, a second hash index effectiveness for the first index based at least in part on the second index usage data;
comparing, by the database management system, the second hash index effectiveness to the threshold hash index effectiveness; and
modifying the hash index status of the first index, by the database management system, based at least in part on the comparing of the second hash index effectiveness to the threshold hash index effectiveness.

13. The method of claim 12, wherein the second hash index effectiveness is greater than the threshold hash index effectiveness, further comprising resuming use of the first hash index associated with the first index.

14. The method of claim 12, wherein the second hash index effectiveness is less than the threshold hash index effectiveness, further comprising deleting the first hash index.

15. The method of claim 9, wherein determining the first hash index effectiveness comprises determining a portion of a set of queries indicating the first index that are point queries.

16. The method of claim 9, wherein determining the first hash index effectiveness comprises determining a portion of a set of point queries indicating the first index for which a matching hash node is found at a hash index associated with the first index.

17. A machine-readable medium comprising instructions thereon that, when executed by at least one processor, cause the at least one processor to perform operations comprising:
receiving, by a database management system, first index usage data for a first index describing a database, the first index usage data describing usage of the first index by the database management system;
determining, by the database management system, a first hash index effectiveness for the first index based at least in part on the first index usage data;
comparing, by the database management system, the first hash index effectiveness to a threshold hash index effectiveness; and
modifying a hash index status of the first index, by the database management system, based at least in part on the comparing, the hash index status indicating whether the database management system utilizes a first hash index to process queries associated with the first index.

18. The medium of claim 17, further comprising instructions thereon that, when executed by the at least one processor, cause the at least one processor to perform operations comprising:
receiving an instruction to enable hash index auto-tuning;
receiving a first point query for processing with the first index; and
after receiving the first point query, generating the first hash index, wherein at least a portion of the first index usage data is generated after generating the first hash index.

19. The medium of claim 17, wherein the first hash index effectiveness is greater than the threshold hash index effectiveness, and wherein modifying the hash index status of the first index comprises generating the first hash index associated with the first index.

20. The medium of claim 17, wherein the first hash index effectiveness is less than the threshold hash index effectiveness, and wherein modifying the hash index status of the first index comprises pausing use of the first hash index, further comprising instructions thereon that, when executed by the at least one processor, cause the at least one processor to perform operations comprising:
- receiving, by the database management system, second index usage data for the first index captured after the pausing use of the first hash index;
- determining, by the database management system, a second hash index effectiveness for the first index based at least in part on the second index usage data;
- comparing, by the database management system, the second hash index effectiveness to the threshold hash index effectiveness; and
- modifying the hash index status of the first index, by the database management system, based at least in part on the comparing of the second hash index effectiveness to the threshold hash index effectiveness.

* * * * *